United States Patent
Basson et al.

(10) Patent No.: US 9,477,615 B1
(45) Date of Patent: Oct. 25, 2016

(54) BI-DIRECTIONAL LOW LATENCY BUS MODE

(75) Inventors: Gal Basson, Haifa (IL); Tal Azogui, Ganot-Hadar (IL)

(73) Assignee: Qualcomm Incorporated, San Diego, CA (US)

( * ) Notice: Subject to any disclaimer, the term of this patent is extended or adjusted under 35 U.S.C. 154(b) by 1212 days.

(21) Appl. No.: 12/539,308

(22) Filed: Aug. 11, 2009

Related U.S. Application Data

(60) Provisional application No. 61/091,864, filed on Aug. 26, 2008.

(51) Int. Cl.
| | |
|---|---|
| *G06F 13/00* | (2006.01) |
| *G06F 13/20* | (2006.01) |
| *H04B 1/38* | (2006.01) |
| *H04W 4/00* | (2009.01) |
| *G06F 13/12* | (2006.01) |

(52) U.S. Cl.
CPC ............. *G06F 13/00* (2013.01); *G06F 13/20* (2013.01); *H04B 1/38* (2013.01); *H04W 4/00* (2013.01)

(58) Field of Classification Search
CPC ........ G06F 13/00; G06F 13/12; G06F 13/20; H04B 1/38; H04W 4/00
USPC ............... 710/33, 62, 313; 455/73; 370/328; 375/220
See application file for complete search history.

(56) References Cited

U.S. PATENT DOCUMENTS

| | | | | |
|---|---|---|---|---|
| 7,058,738 | B2 * | 6/2006 | Stufflebeam, Jr. ............ | 710/104 |
| 7,430,182 | B2 * | 9/2008 | Kwon et al. .................. | 370/310 |
| 7,801,099 | B2 | 9/2010 | Desai | |
| 7,813,362 | B2 * | 10/2010 | Ikeda et al. .................... | 370/412 |
| 7,839,876 | B1 | 11/2010 | Goel et al. | |
| 8,155,139 | B2 | 4/2012 | Wentink et al. | |
| 8,160,505 | B2 | 4/2012 | Yoshimura | |
| 8,386,651 | B2 * | 2/2013 | Chassot ................ | G06F 3/0227 710/104 |
| 8,416,803 | B1 | 4/2013 | Basson et al. | |
| 9,081,905 | B2 * | 7/2015 | Basson ................... | H04L 69/06 |
| 2002/0080756 | A1 * | 6/2002 | Coppola et al. .............. | 370/338 |
| 2004/0179475 | A1 | 9/2004 | Hwang et al. | |
| 2004/0246909 | A1 * | 12/2004 | Ahn .............................. | 370/252 |
| 2004/0246993 | A1 * | 12/2004 | An .......................... | H04L 69/18 370/469 |
| 2005/0075080 | A1 * | 4/2005 | Zhang .............................. | 455/73 |
| 2005/0152358 | A1 | 7/2005 | Giesberts et al. | |
| 2005/0180381 | A1 * | 8/2005 | Retzer ................... | H04J 3/1682 370/349 |
| 2005/0265302 | A1 | 12/2005 | Nishibayashi et al. | |
| 2005/0278756 | A1 * | 12/2005 | Brown .................. | G06F 13/376 725/80 |
| 2006/0013256 | A1 | 1/2006 | Lee et al. | |
| 2006/0029099 | A1 * | 2/2006 | Jang ....................... | H04W 28/06 370/473 |
| 2006/0050709 | A1 * | 3/2006 | Sung ........................ | H04L 47/10 370/394 |
| 2006/0056443 | A1 * | 3/2006 | Tao ........................ | H04W 28/06 3/462 |
| 2006/0083233 | A1 * | 4/2006 | Nishibayashi et al. ....... | 370/389 |

(Continued)

*Primary Examiner* — Henry Tsai
*Assistant Examiner* — Christopher a Daley

(57) ABSTRACT

A method for low latency data transfers between a wireless root device and a wireless endpoint device connected through a wireless peripheral-interconnect bus. The method comprises setting the wireless root device and the wireless endpoint device to operate in bi-directional low latency bus (BDLLB) mode; generating, by the wireless root device, a first data frame to be transmitted to the end-point device, wherein the first data frame includes at least a preamble, a block acknowledgment (ACK) frame and aggregation of a plurality of medium access control service data units (MS-DUs) according to an order they received from a data link layer of the wireless peripheral-interconnect bus; and transmitting the first data frame to the wireless endpoint device over a wireless medium.

19 Claims, 4 Drawing Sheets

(56) References Cited

U.S. PATENT DOCUMENTS

| | | | |
|---|---|---|---|
| 2006/0083234 A1* | 4/2006 | Sung | H04W 28/06 370/389 |
| 2006/0206655 A1* | 9/2006 | Chappell et al. | 710/315 |
| 2006/0221875 A1 | 10/2006 | Trainin | |
| 2007/0038784 A1* | 2/2007 | Sung | H04L 47/10 710/56 |
| 2007/0091931 A1* | 4/2007 | Hwang et al. | 370/474 |
| 2007/0110055 A1 | 5/2007 | Fischer et al. | |
| 2007/0113140 A1 | 5/2007 | Roh et al. | |
| 2007/0201364 A1* | 8/2007 | Nakajima | H04W 28/06 370/230 |
| 2007/0237120 A1* | 10/2007 | Xu | 370/338 |
| 2008/0130538 A1* | 6/2008 | Raissinia | H04W 28/06 370/310 |
| 2008/0172501 A1* | 7/2008 | Goodart et al. | 710/33 |
| 2008/0181286 A1* | 7/2008 | Chen | 375/220 |
| 2008/0192774 A1* | 8/2008 | Singh | H04L 1/1867 370/473 |
| 2008/0209098 A1* | 8/2008 | Landers et al. | 710/302 |
| 2008/0288661 A1 | 11/2008 | Galles | |
| 2009/0003335 A1 | 1/2009 | Biran et al. | |
| 2009/0089576 A1* | 4/2009 | Johnston | H04W 12/02 713/160 |
| 2010/0046367 A1 | 2/2010 | Vermani et al. | |
| 2010/0054215 A1 | 3/2010 | Stahl et al. | |
| 2013/0227184 A1 | 8/2013 | Basson et al. | |

* cited by examiner

BI-DIRECTIONAL LOW LATENCY BUS MODE

CROSS REFERENCE TO RELATED APPLICATIONS

This application claims the benefit of U.S. Provisional Application No. 61/091,864 filed on Aug. 26, 2008, the contents of which are herein incorporated by reference.

TECHNICAL FIELD

The present invention relates generally to wireless peripheral component interconnect busses.

BACKGROUND OF THE INVENTION

Peripheral component interconnect such as PCI Express (PCIe) is a high performance, generic and scalable system interconnect bus for a wide variety of applications ranging from personal computers to embedded applications. PCIe implements serial, full duplex, multi-lane, point-to-point interconnect, packet-based, and switch based technology. Current versions of PCIe buses allow for a transfer rate of 2.5 Gbps per lane, with a total of 32 lanes.

As illustrated in FIG. 1, the PCIe is a layered protocol bus, consisting of a transaction layer 110, a data link layer 120, and a physical layer 130. The PCIe implements split transactions, i.e., transactions with request and response separated by time, allowing the link to carry other traffic while the target device gathers data for the response. With this aim, the primary function of the transaction layer 110 is to assemble and disassemble transaction layer packets (TLPs). TLPs are used to carry transactions, where each TLP has a unique identifier that enables a response directed at the originator. The data link layer 120 acts as an intermediate between the transaction layer 110 and the physical layer 130 and provides a reliable mechanism for exchanging TLPs. The data link layer 120 implements error checking (known as "link cyclic redundancy check (LCRC)") and retransmission mechanisms. LCRC and sequencing are applied on received TLPs and if an error is detected, a data link retry is activated. The physical layer 130 consists of a logical sub-layer 132 and an electrical sub-layer 134. The logical sub-layer 132 is a transmitter and receiver pair implementing symbol mapping, serialization and de-serialization of data. At the electrical sub-layer 134, each lane utilizes two unidirectional low-voltage differential signaling (LVDS) pairs at 2.5 Gbit/s or 5 Gbit/s to transmit and receive symbols from the logical sub-layer 132.

In the current technology, peripheral components are physically coupled to the PCIe. Recently, an effort is being made to wirelessly connect the peripheral devices to a computer. For example, a wireless USB technology for USB and Wi-Fi is a standard for Ethernet connection. However, each such wireless interconnect solution can support the connectivity of only a limited set of peripheral devices.

More advanced solutions propose a wireless peripheral interconnect bus, thereby allowing de-coupling of all peripheral devices connected to a computer. In order to enable efficient wireless transmissions peripheral interconnect bus solutions must guarantee low latency and reliable transmissions of data between the peripheral components of a wireless peripheral interconnect bus.

BRIEF DESCRIPTION OF THE DRAWINGS

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION OF THE INVENTION

Figure 1:
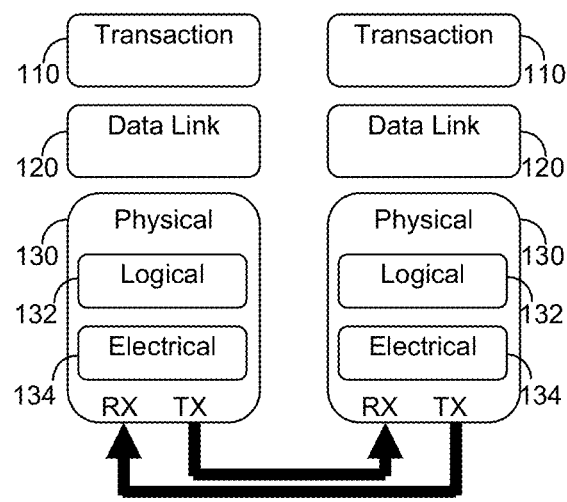
FIG. 1 is a diagram of layered protocol of a conventional PCIe bus.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 2:
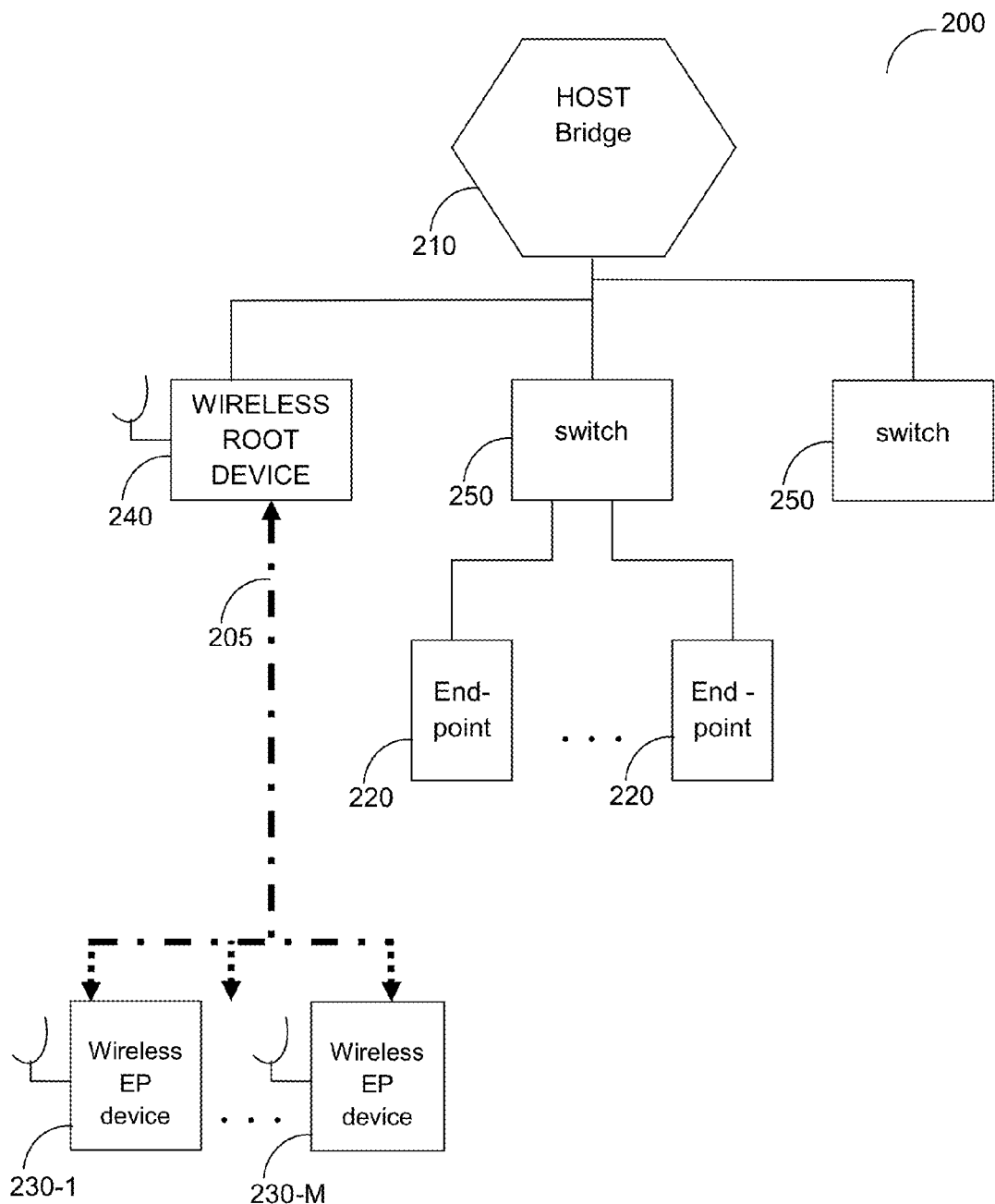
FIG. 2 is a block diagram of a wireless PCIe fabric.

FIG. 2 is an exemplary diagram of a wireless fabric 200 utilized to describe the principles of the invention. The wireless fabric 200 is utilized for connecting peripheral components to a CPU (not shown) of a computer over a wireless medium. The CPU is connected to a host bridge 210 which communicates with endpoints 220, a wireless root device 240, and switches 250. The wireless root device 240 communicates with wireless endpoint devices 230-1 through 230-M using a wireless PCIe bus 205.

The host bridge 210 identifies the wireless root device 240 and endpoint devices 230 as standard bus terminators (e.g., a PCIe endpoint, a PCIe switch, etc.). Data is transferred between the wireless root device 240 and the endpoint devices 230 over a wireless link, where the underlying wireless specifics are transparent to any component connected to fabric 200. A wireless endpoint device 230 may be, but is not limited to, a legacy endpoint, a PCIe endpoint, a PCI switch, etc. and can be utilized to provide a connection to any type of peripheral devices including, but not limited to, storage devices, displays, projectors, monitors, input devices, PDAs, printers, optical disks, and so on. Point-to-multipoint connections are accomplished by the wireless root device 240, which provides the fanout for the wireless PCIe bus 205.

The invention discloses a method and data frame structure adapted to enable low latency bi-directional transmission between the wireless root device 240 and wireless endpoint devices 230. The frame is a data structure that supports the physical (PHY) layer and medium access control (MAC) layer specifications of the wireless PCIe bus 205. An exemplary implementation of the wireless PCIe 205 is described in US Publication No. 2008/0288705 entitled "Wireless Peripheral Interconnect Bus", assigned to the common assignee and is hereby incorporated by reference for merely for the useful understanding of the invention.

Figure 3:
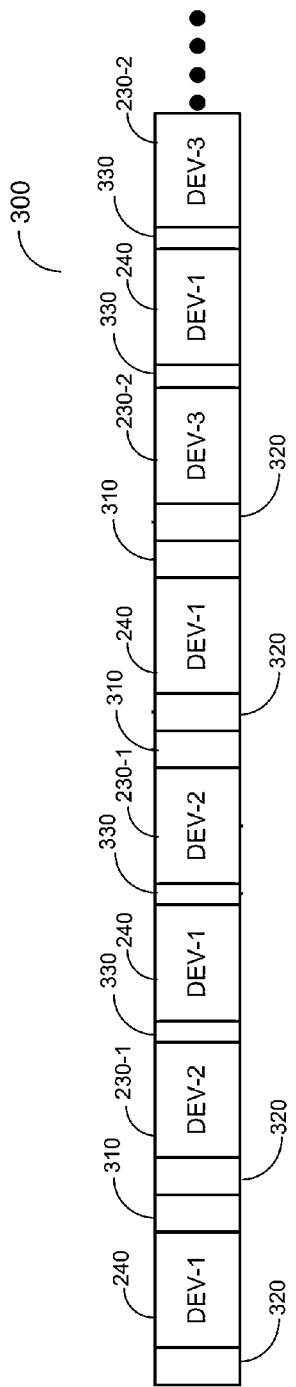
FIG. 3 is a diagram illustrating the bi-directional transmission during a service period.

The frame structure provides means for point-to-multipoint communication between the wireless root device 240 and the plurality of wireless endpoint devices 230. The wireless root device 240 and endpoint devices 230 transmit and receive data packets during service periods, where a service period is defined as a period of time that the wireless root device 240 can communicate with its paired wireless endpoint devices 230. As depicted in FIG. 3, during a service period 300, a wireless root device DEV-1 240 exchanges data with endpoint devices DEV-2 230-1 and DEV-3 230-2. The root device communicates with each endpoint device at a time. For example, first, data is transferred between a wireless root device DEV-1 240 and an endpoint device DEV-2 230-1, and then data is transferred between the wireless root device DEV-1 240 and an endpoint device DEV-3 230-2. In accordance with an embodiment of the invention, when it is a first time that a root device and an endpoint device communicate with each other a short interframe space (SIFS) 310 follows by a long preamble (LP) 320 are transmitted. For subsequent data transfers, only a short preamble (SP) 330 is utilized.

A long preamble 320 typically includes a code sequence that allows a receiving device to perform the tasks of automatic gain control (AGC), signal detection, symbol alignment, frequency offset estimation, timing recovery and channel parameters estimation. The short preamble 330 may be used to increase the link efficiency. A device (either a root or an endpoint) transmits the receptive preamble together with aggregated MAC service data units (MSDUs) within a frame. Two consecutive frames transmitted by two different devices are separated by SIFS 310 that allows a device switching between a transmit mode and a receive mode. The duration of the SIFS can be shorter than that typically being used to further increase the efficiency of the bi-directional transmission mode.

Figure 4:
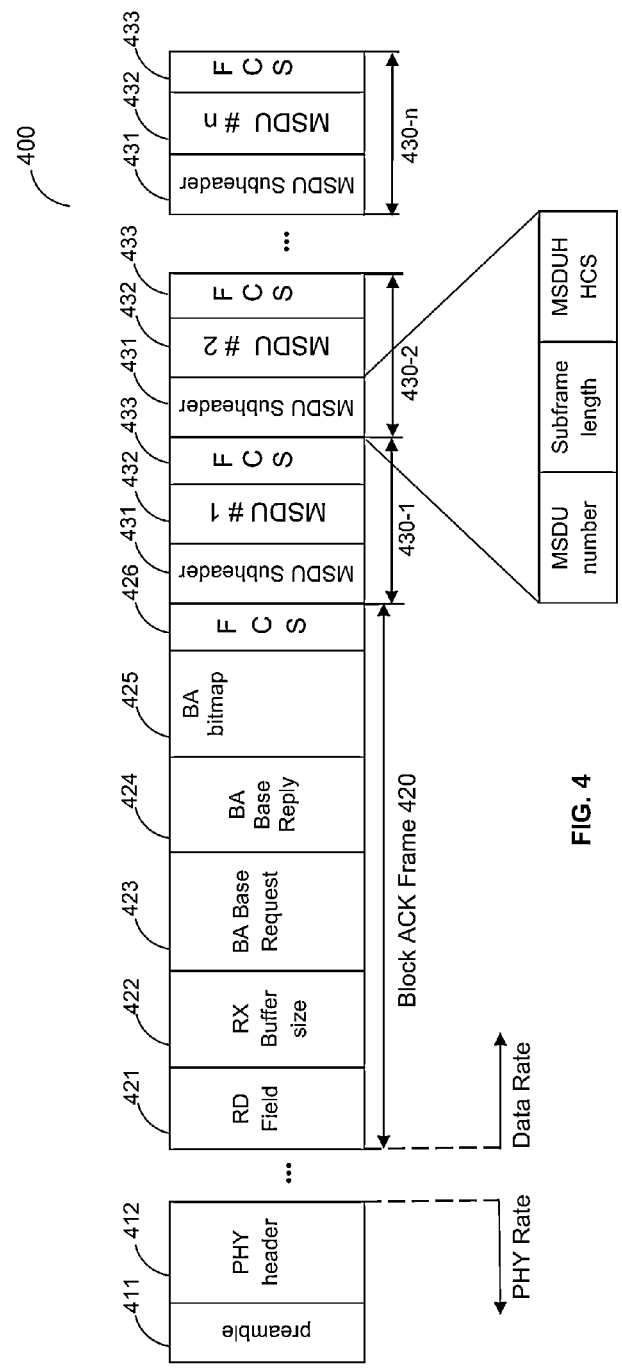
FIG. 4 is a diagram of a frame structure constructed in accordance with certain embodiments of the invention.

FIG. 4 shows a non-limiting and exemplary diagram of a frame structure 400 constructed in accordance with an embodiment of the invention. The frame 400 is transmitted by the wireless root 240 and endpoint devices 230. The structure of the frame 400 provides reliable MAC layer transmission by implementing an in-order delivery, a selective re-transmission of un-acknowledged MSDUs, and a block acknowledgment (ACK) mechanism. In addition, the frame 400 provides a mechanism for aggregating MSDUs and a "cut-through" transfer mode. In the cut-through transfer mode, packets which are being sent by the application layer are immediately being transmitted and are not buffered. It will be appreciated by one of ordinary skill in the art that the mechanisms implemented in accordance with the invention significantly reduce the latency of the wireless PCIe bus 205.

The frame 400 comprises at least a preamble 411, a physical (PHY) header 412, a block acknowledgment (ACK) frame 420, a plurality of MAC service data units (MSDUs) 430-1 through 430-N. The block ACK frame 420 may be sent within the frame 400 and includes the following fields: a reverse direction (RD) 421, a receiver (RX) buffer size 422, a block ACK (BA) base request 423, a BA reply 424, a BA bitmap 425, and a frame checksum (FCS) 426. In the RD field 421 each device (either a root or an endpoint) indicates that a bi-directional transmission is employed. That is, the RD field 421 provides an indication to the receiving device that it should be switched from a receive mode to a transmit mode and replies with ACK information and MSDUs to the transmitting device. The RD field 421 maintains a "MORE" subfield (not shown) indicating additional data is to be sent on either side and implies the continuation of the RD assertion. When the RD "MORE" subfield is cleared, the transmitting device may choose to stop transmission handoff with the current receiving device, and select another device to initiate RD transmission handoff.

The fields 422, 423, 424, and 425 are part of the block ACK (BA) mechanism. This mechanism transmits an ACK message upon a proper reception of a predefined number of MSDUs. The block ACK mechanism further provides an inline handshake of buffer management that determines how many more MSDUs can be transmitted (if there are no available MDSUs, then idle data units are transmitted). Specifically, the RX buffer size field 422 indicates that the free buffer space in MSDU units at the receiver; the BA base request field 423 indicates the block ACK base address expectations from the receiver, i.e., the most recent MSDU sequence number acknowledged at the transmitter; the BA base reply field 424 designates the first MSDU sequence number in the transmitted BA bitmap field 425; and the BA bitmap field 425 includes a number of N bits, a bit per MSDU, indicating whether or not the MSDU was received correctly. The size of the BA bitmap field 425 can be negotiated between the devices. In accordance with an embodiment of the invention the block ACK mechanism enables recovery of payload data (i.e., MSDUs 430) even if the block ACK frame 420 was not correctly transmitted. The FCS field 426 includes a cyclic redundancy check (CRC) code computed for the entire data in the block ACK frame 420.

Each MSDU 430 includes a MSDU subheader 431, MSDU payload data 432, and a frame checksum field 433 which includes a CRC value computed over the MSDU payload data and subheader. A MSDU 430 comprises data packets received from a data link layer (e.g., layer 120) of the PCIe protocol. The MSDU subheader 431 includes three fields: a sequence number of the MSDU, its length and the header checksum.

Figure 5:
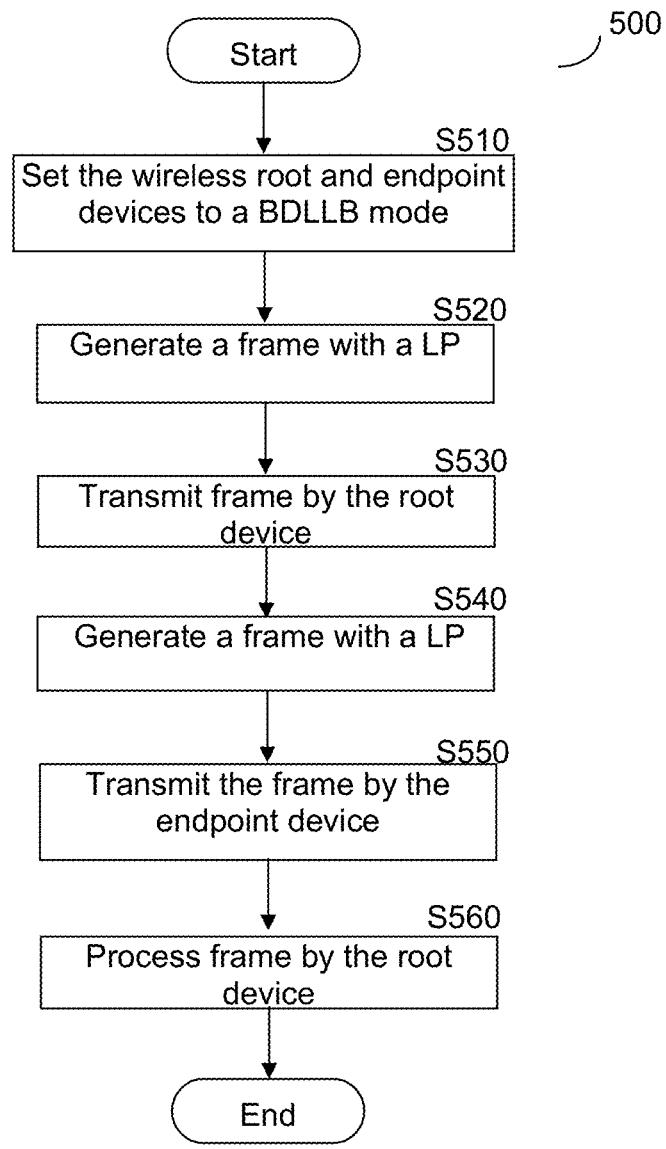
FIG. 5 is a flowchart describing the bi-directional low latency bus mode implemented in accordance with certain embodiments of the invention.

FIG. 5 shows a non-limiting and exemplary flowchart 500 describing the bi-directional low latency bus (BDLLB) mode implemented in accordance with certain embodiments of the invention. The BDLLB mode allows low latency data transfers between a wireless root device 240 and wireless end point devices 230.

At S510, the wireless root and the endpoint devices are set to operate in the BDLLB mode. Specifically, a wireless root device 240 advertises its capabilities (e.g., data rate) and association information and an endpoint device 230 searches for a wireless root device 240 operating in a BDLLB mode to establish the connection with. The search also can be initiated by the wireless root device 240. Once the operation mode is set, a time for transmission during a service period is allocated for both wireless root device 240 and endpoint device 230. At S520, the wireless root device 240 generates a frame to be transmitted to the endpoint device 230. As this is a first time that data is transferred between the devices, the preamble 411 would be a long preamble. In addition, the RD field 421 is set for reverse-direction, the RX buffer size field 422 is set for a maximum MSDUs that the root can receive, and the bits in the BA bitmap 425 are set to null. MSDUs received from a data link layer are order, in the MSDU 430, according to the order in which they received from the data link layer. The receptive MSDU subheaders 431 are also generated. At S530, after waiting for the SIFS period to elapse, the generated frame is sent to the endpoint device, which processes the frame and switches from a receive mode to a transmit mode.

Upon reception of the frame, at S540, the endpoint generates a frame to be transmitted to the wireless root device 240. This includes generating a long preamble to be inserted in the preamble field 411, setting the RX buffer size 422 to the free space in the buffer, and designating in the BA bitmaps MSDUs that were properly received. In addition, aggregated MSDUs are arranged in the frame 400 according to the order in which they received from a data link layer. At S550, the generated frame is sent from the endpoint device 230 to the wireless root device 240. At S560, the received frame is processed by the wireless root device 240 which checks at least which MSDUs were not acknowledged, thereby were not received at the endpoint 230. The MSDUs will be transmitted in the next frame sent from the wireless root device 240 to the endpoint device 230. It should be noted that using the BA base request 423 and BA base reply 424 the root device 240 may decide not to re-transmit one or more MSDUs. Any subsequent transmissions will be performed as described herein, where a short preamble may be used instead of a long preamble in field 411.

The teachings described herein can be adapted for the use with any peripheral interconnect bus including, but not limited to, PCIe second generation, PCIe third generation, SATA, USB, and the like. Moreover, some or all of the method components described herein are implemented as a computer executable code. Such a computer executable code contains a plurality of computer instructions that when performed result with the execution of the tasks disclosed herein. Such computer executable code may be available as source code or in object code, and may be further comprised as part of, for example, a portable memory device or downloaded from the Internet, or embodied on a program storage unit or computer readable medium. Information that is generated by the computer executable code may be output from a computer. In accordance with another embodiment, the invention described herein can be utilized to provide an efficient communication between a wireless docking station and a plurality of peripheral devices wirelessly connected to the docking station.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention. Most preferably, the principles of the invention are implemented as any combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A method for wireless communication, comprising:
generating, by a first device, a first frame for transmission over a wireless peripheral-interconnect bus, wherein the first frame includes a preamble, a header, a block acknowledgment (ACK) frame, and a plurality of medium access control service data units (MSDUs), wherein the MSDUs are aggregated according to an order the MSDUs were received from a data link layer of the wireless peripheral-interconnect bus; and
transmitting the first frame to a second device over a wireless medium of the wireless peripheral-interconnect bus.

2. The method of claim 1, further comprising:
receiving a second frame, wherein the second frame indicates MSDUs of the first frame that were properly received by the second device.

3. The method of claim 2, further comprising, upon reception of the second frame:
checking which MSDUs were not properly received;
generating a third frame comprising the MSDUs that were not properly received; and
sending the third frame to the second device.

4. The method of claim 1, wherein the preamble is a long preamble for a first data transfer between the first device and the second device, and wherein the preamble is a short preamble for any subsequent data transfers between the first device and the second device.

5. The method of claim 3, wherein the block ACK frame comprises at least one of:
reverse direction (RD) field indicating that a bidirectional communication is employed;
a receiver buffer size field indicating the number of MSDUs that can be received by the first device;
a block ACK request field indicating a most recent MSDU sequence number acknowledged by the first device;
a block ACK bitmap field comprising a number of bits corresponding to the number of transmitted MSDUs, wherein each of the bits indicate whether the respective MSDU was properly received;
a block ACK reply field indicating a first MSDU sequence number in the block ACK bitmap field; or
a frame checksum (FCS) field including an error correction code computed based on the block ACK frame.

6. The method of claim 5, wherein generating the first frame comprises:
setting the receiver buffer size field to a maximum number of MSDUs that the first device can receive; and
setting the block ACK bitmap field to a null value.

7. The method of claim 3, wherein the second frame comprises a buffer size field indicating an amount of free space in a buffer of the second device.

8. An apparatus for wireless communication comprising:
a processor configured to:
generate a frame, wherein the frame comprises:
a preamble;
a header;
a block acknowledgment (ACK) frame; and
a plurality of medium access control service data units (MSDUs), wherein the MSDUs are aggregated according to an order the MSDUs were received from a data link layer of a wireless peripheral-interconnect bus; and
output the frame for transmission over a wireless medium of the wireless peripheral-interconnect bus.

9. The apparatus of claim 8, wherein the preamble is a long preamble for a first data transfer between the apparatus and a second device to which the frame is transmitted, and wherein the preamble is a short preamble for any subsequent data transfers between the apparatus and the second device.

10. The apparatus of claim 8, wherein the block ACK frame comprises at least one of:

a reverse direction (RD) field indicating that a bi-directional communication is employed;

a receiver buffer size field indicating the number of MSDUs that can be received by the apparatus;

a block ACK request field indicating a most recent MSDU sequence number acknowledged by the apparatus;

a block ACK bitmap field comprising a number of bits corresponding to the number of transmitted MSDUs, wherein each of the bits indicates whether the respective MSDU was properly received;

a block ACK reply field indicating a first MSDU sequence number in the block ACK bitmap field; or a frame checksum (FCS) field including an error correction code computed based on the block ACK frame.

11. The apparatus of claim 10, wherein the processor is configured to negotiate the size of the block (ACK) bitmap field with another apparatus.

12. The apparatus of claim 8, wherein each of the MSDUs comprises a header, MSDU payload data, and a checksum field including an error code value computed based on the MSDU payload data and the header.

13. The apparatus of claim 12, wherein the MSDU payload data comprises data packets received from the data link layer of the wireless peripheral-interconnect bus.

14. The apparatus of claim 12, wherein the header of one of the MSDUs comprises a sequence number of that MSDU, a length of that MSDU and a checksum field.

15. A computer-readable medium having instructions stored thereon for:

generating, by a first device, a first frame for transmission over a wireless peripheral-interconnect bus, wherein the first frame comprises a preamble, a header, a block acknowledgment (ACK) frame, and a plurality of medium access control service data units (MSDUs), wherein the MSDUs are aggregated according to an order the MSDUs were received from a data link layer of the wireless peripheral-interconnect bus; and transmitting the first frame to a second device over a wireless medium of the wireless peripheral-interconnect bus.

16. The computer-readable medium of claim 15, further comprising:

receiving a second frame, wherein the second frame indicates MSDUs of the first frame that were properly received by the second device.

17. The computer-readable medium of claim 16, further comprising, upon reception of the second frame:

checking which MSDUs were not properly received;

generating a third frame comprising the MSDUs that were not properly received; and sending the third frame to the second device.

18. The computer-readable medium of claim 17, wherein the second frame comprises a buffer size field indicating an amount of free space in a buffer of the second device.

19. The computer-readable medium of claim 15, wherein the preamble is a long preamble for a first data transfer between the first device and the second device, and wherein the preamble is a short preamble for any subsequent data transfers between the first device and the second device.

* * * * *